July 25, 1950 V. J. DUKE 2,516,556

VOLTAGE CONTROL CIRCUITS

Filed July 13, 1946

INVENTOR
VERNON J. DUKE
BY H. G. Grover
ATTORNEY

Patented July 25, 1950 2,516,556

UNITED STATES PATENT OFFICE 2,516,556

VOLTAGE CONTROL CIRCUITS

Vernon J. Duke, Rockville Centre, N. Y., assignor to Radio Corporation of America, a corporation of Delaware Application July 13, 1946, Serial No. 683,319

9 Claims. (Cl. 179—171)

This invention relates to amplifying systems and more particularly to a voltage control circuit which may be used for controlling bias voltages.

It is often desirable to change bias voltages substantially linearly and between given levels at predetermined rates of change.

The utilization of electrical communication channels for the transmission of television image signals has made it increasingly important that a satisfactory system for fading in going from one scene to another be provided. The use of optical fading systems in the motion picture art is such that all have become accustomed to it and many desirable and unique effects can be obtained with its use.

Heretofore it has been the usual practice to manually control the rate of change in gain of an amplifier to produce the desired fading. The change in gain can be accomplished by gradually changing the control electrode bias in an amplifier tube of the system.

In order to produce the most desirable effect in fading, it is desirable that a substantially linear variation in image light intensity be obtained. By properly controlling the gain of appropriate amplifying circuits in a television system, very satisfactory fading of images will result.

The primary object of this invention is to obtain substantially linear voltage variations between two predetermined voltage levels and at a predetermined rate of variation.

Another object of this invention is to provide a new and improved amplifying system.

Still another object of this invention is to provide a new and improved bias control circuit for an amplifying system.

Other and incidental objects of the invention will be apparent to those skilled in the art from a reading of the following specifications and an inspection of the accompanying drawing, in which.

Although this invention may take several forms, a preferred form involving its employment in a resistance coupled amplifier will be shown and described as illustrative.

Figures 1, 2:
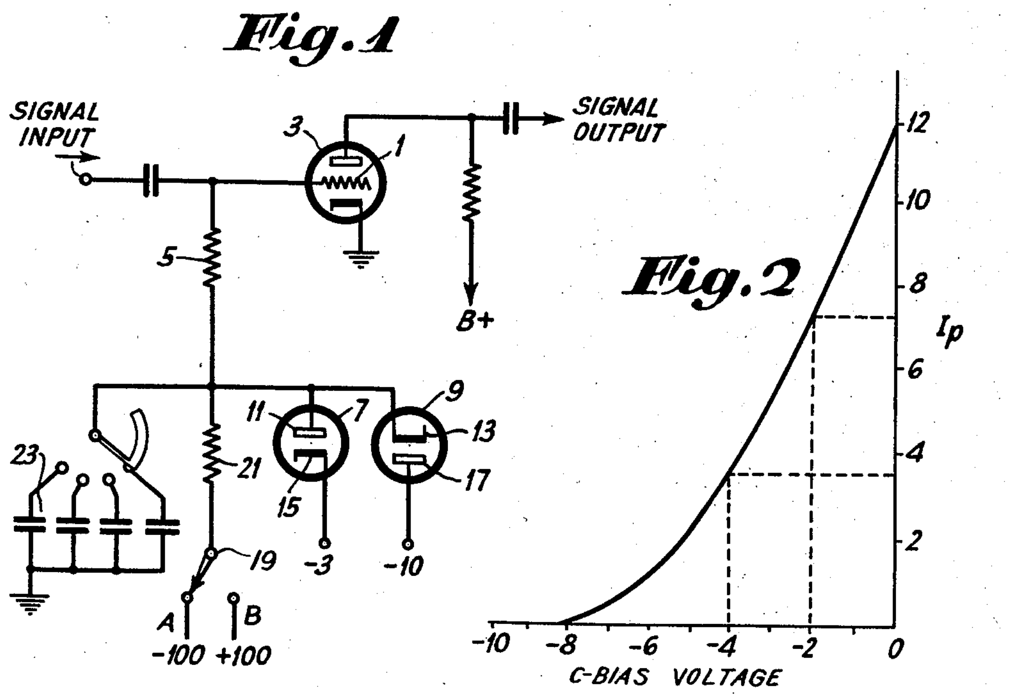
Figure 1 shows by circuit diagram a preferred form of this invention.
Figure 2 illustrates a characteristic curve of a typical amplifier tube.

Referring now to Figure 1, there is illustrated a stage of a video amplifier, for instance, wherein the bias on the control electrode 1 of tube 3 is changed substantially linearly between two predetermined voltage levels and at a predetermined rate of variation.

The control electrode resistor 5 is connected to control electrode 1 and to a pair of diodes 7 and 9. The anode 11 of diode 7 is connected to resistor 5 and to the cathode 13 of diode 9.

The cathode 15 of diode 7 is connected to the one of two desired bias potentials having the most positive value. Anode 17 of diode 9 is connected to the other desired bias potential having the most negative value.

A switch 19 is provided to select a potential more positive in value than either of the desired bias potentials or a second potential more negative in value than either of the desired bias potentials.

A group of condensers 23 are connected to the switch 19 through resistance 21.

As is known in the art, the difference in potential between the control electrode and the cathode of a thermionic tube is called the bias of the tube, with the purpose being to establish the control electrode at a potential with respect to its associated cathode which will place the tube in the desired operating condition.

Varying the potential of the control electrode has a control effect on the anode current output of the tube. If the control electrode is made sufficiently negative with respect to the cathode, no electrons reach the anode and therefore the anode current is zero. The smallest negative voltage between the control electrode and its associated cathode which causes the tube to cease conducting is called the cut-off bias.

If the control electrode is made slightly less negative with respect to its associated cathode, some electrodes pass the control electrode and move to the anode, producing a small anode current. Further decrease in the negative control electrode voltage allows further increase in anode current.

So long as the control electrode is negative with respect to its associated cathode, no electrons are attracted to the control electrode and no current can flow in the control electrode circuit, hence under these conditions, the control electrode circuit consumes no power.

When the potential of the control electrode is equal to that of its associated cathode, the tube operates similar to the operation of a diode. When the control electrode is positive with respect to its associated cathode, an accelerating influence is exerted on the electrons and some of them are attracted to the control electrode, causing an appreciable current flow in the control electrode circuit. Under these conditions, power is dissipated in the control electrode circuit, and to avoid this power consumption, thermionic tubes are generally operated with a control electrode voltage varying in a negative direction from zero potential.

It will be seen that in order to maintain voltage variations on the control electrode in a negative direction from zero voltage, it is necessary that a negative bias be applied to the control electrode.

The effect of signals and variations of control electrode voltage on the anode current of a vacuum tube can be shown graphically by a characteristic curve. A characteristic curve of a typical amplifier tube, a triple grid detector amplifier 6SJ7, is shown in Figure 2. When the control electrode voltage —C is adjusted to —3 volts, an alternating current signal applied to the control electrode will produce a variation in anode current representative of the control electrode voltage wave form. If a signal causes the control electrode voltage to vary between —2 and —4 volts, this is, one volt each side of the bias potential of —3 volts, there will be produced in the anode circuit a variation in current between 7.7. milliamperes and 3.5 milliamperes.

It will be seen, however, if the control electrode bias —C is increased in a negative direction to —10 volts and the same signal voltage is applied to the control electrode, no current will flow in the anode circuit and therefore no change in current will result. When there is no change in the anode current, the amplification factor of the tube can be considered to be zero.

It will be also seen that a gradual increase in a negative direction of the control electrode bias —C between —3 volts and —10 volts will result in a gradual decrease in the amplification factor of the tube.

If a potential is applied to a series circuit including resistance and capacity, a current flows which charges the capacitor. At the instant current begins to flow, there is no voltage on the capacitor, therefore the voltage across the divider must appear as the voltage drop across the resistor. The initial current then must be equal to E/R where E is equal to the applied voltage and R is equal to the resistance. The current flowing in the circuit soon charges the capacitor a small amount. Since the voltage on the capacitor is proportional to the charge on it, a small voltage will appear across the capacitor. This small voltage is opposite in polarity to and will subtract from the applied voltage. As a result, the voltage across the resistor is less. Since the resistance value R is fixed, the charging current must decrease. The capacitor will charge more slowly as the charge on the condenser builds up. The increase in voltage across the condenser will therefore follow an exponential curve.

For all practical purposes, the very first portion of an exponential curve may be considered a substantially straight line. The slope is dependent upon the time constant of the circuit.

The time required to charge a capacitor to 63% or to discharge it to 37% of its final voltage is known as the time constant of the circuit. The value of the time constant in seconds is equal to the product of the circuit resistance in ohms and capacity in farads.

It therefore follows that if only the beginning portion of the exponential curve is used, a substantially linear change between two predetermined voltage values may be obtained at a rate governed by the value of capacity and resistance of the circuit. This may be expressed mathematically as follows:

$$t = RC \log_e \frac{E_{aa} - E_b}{E_{bb} - E_a}$$

where $t$ is time in seconds
R is resistance in ohms
C is capacity in farads
$E_a$ is one desired bias potential
$E_b$ is a second desired bias potential
$E_{aa}$ is applied potential
$E_{bb}$ is a second applied voltage.

The operation of the circuit shown in Figure 1 is as follows: If, for example, it is desired to apply to the control electrode 1 a negative bias of 10 volts, switch 19 is thrown to position A. Capacity 23, which may take the form of several condensers connectable in parallel, will start to charge exponentially towards —100 volts in accordance with the resistance capacity charging curve. The rate of charge will depend on the circuit characteristics and the charge will be substantially linear in rate at the beginning of the charging interval. When, however, the charge on the capacitors 23 reaches the desired bias of —10 volts, diode 9 will start to conduct, because when cathode 13 becomes more negative than anode 17, a current will flow in diode 9. The bias applied to control electrode 1 will therefore remain at —10 volts as long as switch 19 is in position A.

When a change to the other predetermined bias value is desired and switch 19 is thrown to position B, capacity 23 will start charging exponentially toward +100 volts. However, when the capacity 23 has reached a charge of negative 3 volts, diode 7 will begin to conduct because anode 11 cannot exceed in a positive direction the potential of cathode 15 without causing diode 7 to become conducting.

There results a substantially linear voltage variation between —3 volts and —10 volts at a rate governed by the circuit characteristics.

When a change-back to —3 volt bias is desired, switch 19 is returned to position A. Capacity 23 will start charging exponentially from —3 volts toward —100 volts. However, when the capacity has attained a charge of negative 10 volts, diode 9 will begin to conduct, because when cathode 13 becomes more negative than anode 17, a current will flow in diode 9.

There results a substantially linear voltage variation between —10 and —3 volts at a rate governed by the circuit characteristics.

Figure 3:
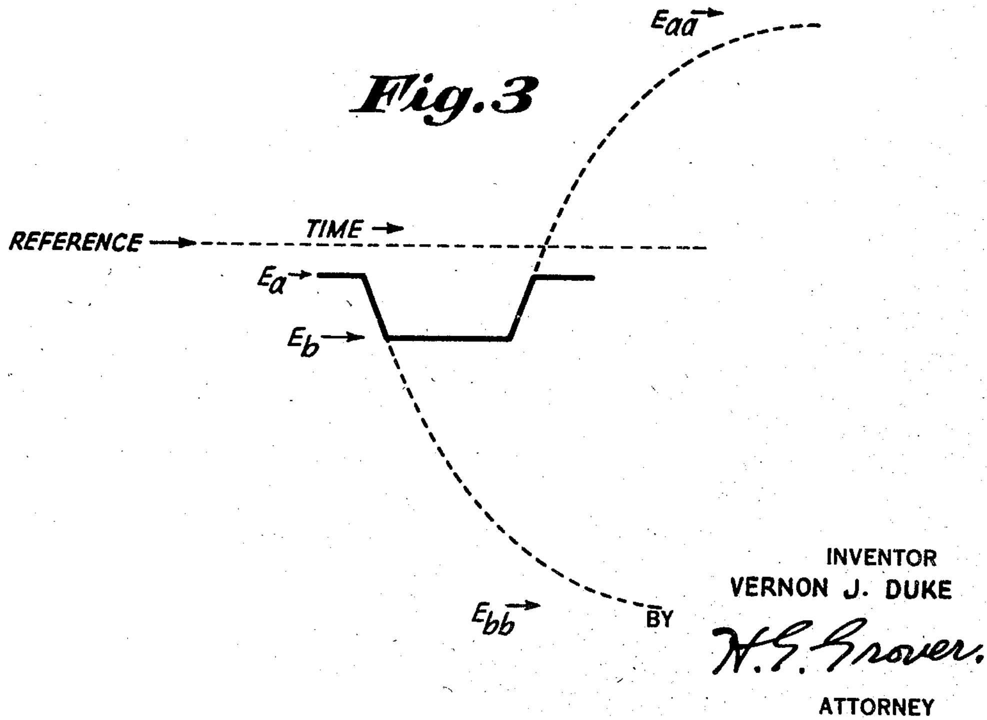
Figure 3 illustrates graphically the operation of this invention.

The action of the circuit in Figure 1 is further illustrated in Figure 3, wherein a reference voltage level is shown with predetermined voltage level $E_a$ and $E_b$. There is shown a source of potential $E_{aa}$ more positive in value than either of the predetermined voltage levels $E_a$ and $E_b$ and a second source of potential $E_{bb}$ more negative in value than either of the predetermined voltage levels $E_a$ or $E_b$.

When the capacity is charged to a voltage level equivalent to $E_a$ and a potential $E_{bb}$ is applied through a resistance, the capacity will start to charge exponentially to a value $E_{bb}$. When the charge of the capacity reaches the value $E_b$, the increase in charge stops because of the diode action, as explained above, and the charge on the capacity will remain at $E_b$ until the potential $E_{aa}$ is applied, causing the condenser to start charging toward the level $E_{aa}$. When the charge on the capacity reaches the value $E_a$, it will stop charging because of the action of the other diode. It will be seen that the portion of the exponential charging curve between voltage values $E_a$ and $E_b$ is substantially straight.

Having now described the invention, I claim:

1. A circuit to obtain substantially linear voltage variations between two predetermined voltage levels and at predetermined rates of variation comprising a point of reference voltage, an electrical terminal, a capacity connected between said point of reference voltage and said terminal, a pair of sources of different predetermined voltage levels, a source of potential more positive in value than either of said predetermined voltage levels, a second source of potential more negative in value than either of said predetermined levels, a switch selectably connected to each of said sources of potential, a resistance connected between said terminal and said switch to permit said capacity to receive a charge from one of said sources of potential, and means to limit the charge of said capacity including a pair of rectifiers connected to said terminal and so poled and biased that one only of said rectifiers will pass current when the potential of said terminal exceeds the range of potential whose limits are defined by said predetermined voltage levels.

2. A circuit to obtain substantially linear voltage variations between two predetermined voltage levels and at predetermined rates of variation comprising a point of reference voltage, an electrical terminal, a capacity connected between said point of reference voltage and said terminal, a source of potential more positive in value than either of said predetermined voltage levels, a second source of potential more negative in value than either of said predetermined levels, and a resistance selectively connected between said terminal and one of said sources of potential to permit said capacity to receive a charge from one of said sources of potential, a pair of additively poled and serially connected rectifiers connected between points of said two predetermined voltage levels, and a connection between said terminal and the point of interconnection of said rectifiers.

3. A circuit to obtain substantially linear voltage variations between two predetermined voltage levels and at predetermined rates of variation comprising a point of constant voltage, an electrical terminal, a capacity connected between said point of constant voltage and said terminal, a pair of points of different predetermined voltage levels, a source of potential more positive in value than either of said predetermined voltage levels, a second source of potential more negative in value than either of said predetermined voltage levels, and a resistance connected between said terminal and one at a time of said sources of potential to permit said capacity to receive a charge from one of said sources of potential, a rectifier connected between said terminal and said point of predetermined voltage level having the most negative value and polarized to prevent the potential of said terminal to exceed in a negative direction said predetermined voltage level having the most negative value, a second rectifier connected between said terminal and said point of predetermined voltage level having the most positive value and polarized to prevent the potential of said terminal to exceed in a positive direction said predetermined voltage level having the most positive value.

4. A circuit to obtain substantially linear voltage bias variations between two points having different predetermined voltage levels and at predetermined rates of variation comprising a point of reference voltage, an electrical terminal, a capacity connected between said point of reference voltage and said terminal, a source of potential more positive in value than either of said predetermined voltage levels, a second source of potential more negative in value than either of said predetermined voltage levels, a resistance, a switch selectively connected between each of said sources and to said resistance, a rectifier connected to said terminal, a bias for said rectifier, the bias and the polarization of said rectifier so arranged to cause said rectifier to draw current when the voltage of said terminal reached one of said predetermined voltage levels, a second rectifier connected to said terminal, a bias for said rectifier, the bias and the polarization of said rectifier so arranged to cause said rectifier to pass current when the coltage of said terminal reached the other of said predetermined voltage levels.

5. A circuit to obtain substantially linear voltage variations between two predetermined voltage levels and at predetermined rates of variation comprising a point of reference voltage, a source of each of said predetermined voltage levels, an electrical terminal, a capacity connected between said point of reference voltage and said terminal, a source of potential more positive in value than either of said predetermined voltage levels, a second source of potential more negative in value than either of said predetermined levels, means for selectively connecting a resistance between said terminal and one of said sources of potential to permit said capacity to receive a charge from one of said sources of potential, and means to limit the charge of said capacity including a different diode connected between said terminal and each of said sources of said predetermined voltage levels, said diodes connected additively in series between said voltage sources and having their anodes connected in the direction of the most negative source.

6. A circuit to obtain substantially linear voltage variations between two predetermined voltage levels and at predetermined rates of variation comprising a point of reference voltage, an electrical terminal, a capacity connected between said point of reference voltage and said electrical terminal, a source of potential more positive in value than either of said predetermined voltage levels, a second source of potential more negative in value than either of said predetermined levels, a switch connected selectively to each of said sources, and a resistance connected between said terminal and said switch to permit said capacity to receive a charge from one of said sources of potential, a pair of serially and additively connected diodes, a connection between said terminal and said point of interconnection of said diodes, a bias potential for each of said diodes to cause one or the other of said diodes to become conducting when the potential of said terminal exceeds the range of potential whose limits are defined by said predetermined voltage levels.

7. A circuit to obtain substantially linear voltage variations between two points of predetermined voltage levels and at predetermined rates of variation comprising a point of reference voltage, an electrical terminal, a capacity connected between said point of reference voltage and said terminal, a source of potential more positive in value than either of said predetermined voltage levels, a second source of potential more negative in value than either of said predetermined levels, a switch selectively connected between said sources and a resistance connected between said terminal and said switch, a first diode having an anode connected to said terminal, a cathode for said first diode, a second diode having a cathode connected to said terminal, an anode for said second diode, a connection between said cathode of said first diode and a point whose potential is equal to said predetermined voltage level having the most positive value of said predetermined voltage levels, and a connection between said anode of said diode and a point whose potential is equal to said predetermined voltage level having the most negative value of said predetermined voltage levels.

8. In an amplifying circuit, means to obtain variations in gain of said amplifier at predetermined rates of variation comprising a point of reference voltage, an electrical terminal, an amplifier tube having a control electrode, a resistance connected between said terminal and said control electrode, a capacity connected between said point of reference voltage and said terminal, a source of potential more positive in value than either of said predetermined voltage levels, a second source of potential more negative in value than either of said predetermined voltage levels, a two position switch, a connection between each position and one different of said sources, and a resistance connected between said terminal and said switch, a pair of serially connected and like poled diodes connected between two different points of potential, said diodes having their point of connection also connected to said terminal.

9. In a television system, a circuit to obtain substantially linear variation in image light intensity at predetermined rates of variation comprising a point of reference voltage, an electrical terminal, an amplifier tube in said system having a control electrode, a resistance connected between said terminal and said control electrode, a capacity connected between said point of reference voltage and said terminal, sources of two predetermined voltage levels representative of the desirable limits in variations of image light intensity, a source of potential more positive in value than either of said predetermined voltage levels, a second source of potential more negative in value than either of said predetermined voltage levels, a switch for each of said sources of potential and a resistance connected between said terminal and said switches, a rectifier connected between said terminal and said predetermined voltage level having the most negative value and polarized to prevent the potential of said terminal to exceed in negative direction said predetermined voltage level having the most negative value, and a second rectifier connected between said terminal and said predetermined voltage level having the most positive value and polarized to prevent the potential of said terminal to exceed in a positive direction said predetermined voltage level having the most positive value.

VERNON J. DUKE.

REFERENCES CITED

The following references are of record in the file of this patent:

UNITED STATES PATENTS

| Number | Name | Date |
|---|---|---|
| 1,867,139 | De Bellescize | July 12, 1932 |
| 1,956,711 | De Bellescize | May 1, 1934 |
| 2,240,420 | Schnitzer | Apr. 29, 1941 |
| 2,307,901 | Thorpe | Jan. 12, 1943 |
| 2,315,374 | Hutchens | May 30, 1943 |
| 2,370,692 | Shepherd | Mar. 6, 1945 |